US006581125B1

(12) United States Patent
Lange et al.

(10) Patent No.: US 6,581,125 B1
(45) Date of Patent: Jun. 17, 2003

(54) PCI BRIDGE HAVING LATENCY INDUCING SERIAL BUS

(75) Inventors: Ronald E. Lange, Glendale, AZ (US); David Ross Evoy, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/312,206

(22) Filed: May 14, 1999

(51) Int. Cl.[7] .............................................. G06F 13/14
(52) U.S. Cl. ...................... 710/305; 710/300; 710/310
(58) Field of Search ................................. 710/305, 306, 710/310, 311, 312, 313, 314, 315, 300, 301, 302, 303, 304

(56) References Cited

U.S. PATENT DOCUMENTS

| 5,619,544 | A | * | 4/1997 | Lewis et al. ................. 375/377 |
| 5,751,975 | A | | 5/1998 | Gillespie et al. ............. 395/306 |
| 5,768,612 | A | | 6/1998 | Nelson .................... 395/800.32 |
| 5,835,739 | A | | 11/1998 | Bell et al. .................... 395/308 |
| 5,838,935 | A | | 11/1998 | Davis et al. ................. 395/309 |
| 5,933,609 | A | * | 8/1999 | Walker et al. .............. 710/101 |
| 5,978,878 | A | * | 11/1999 | Lange ........................ 710/129 |
| 6,003,105 | A | * | 12/1999 | Vicard et al. ............... 710/129 |
| 6,070,214 | A | * | 5/2000 | Ahern ........................ 710/128 |
| 6,092,139 | A | * | 7/2000 | Crane, Jr. et al. ........... 710/127 |
| 6,094,700 | A | * | 7/2000 | Deschepper et al. ........ 710/129 |
| 6,298,407 | B1 | * | 10/2001 | Davis et al. ................. 710/129 |

* cited by examiner

Primary Examiner—Sumati Lefkowitz
Assistant Examiner—X. Chung-Trans
(74) Attorney, Agent, or Firm—Peter Zawilski

(57) ABSTRACT

A computer system includes a host processor, a first PCI bus, a second PCI bus and a bus bridge. The first PCI bus is coupled with the host processor. The bus bridge interconnects the first and second PCI buses. The bus bridge includes a first portion having a first bridge memory, a second portion having a second bridge memory, and a latency inducing serial bus interconnecting the first portion and the second portion. A method is also taught.

17 Claims, 7 Drawing Sheets

| CONTROL CODE | D7 | D6 | D5 | D4 | D3 | D2 | D1 | D0 |
|---|---|---|---|---|---|---|---|---|
| | RCVF | INT | | | TBD | TBD | TBD | |
| POR IDLE VALUE | 0 | 0 | 0 | 0 | 0 | 0 | 0 | 0 |

FIG. 4

| PCI CFG 0 | D39 | D38 | D37 | D36 | D35 | D34 | D33 | D32 |
|---|---|---|---|---|---|---|---|---|
| | RCVF | FPAR | PCMD[1:0] | | | CMD/BE[3:0] | | |
| | D31 | D30 | D29 | D28 | D27 | D26 | D25 | D24 |
| | | | PCI DATA/ADDRESS[31:24] | | | | | |
| | D23 | D22 | D21 | D20 | D19 | D18 | D17 | D16 |
| | | | PCI DATA/ADDRESS[23:16] | | | | | |
| | D15 | D14 | D13 | D12 | D11 | D10 | D9 | D8 |
| | | | PCI DATA/ADDRESS[15:8] | | | | | |
| | D7 | D6 | D5 | D4 | D3 | D2 | D1 | D0 |
| | | | PCI DATA/ADDRESS[7:0] | | | | | |

FIG. 5

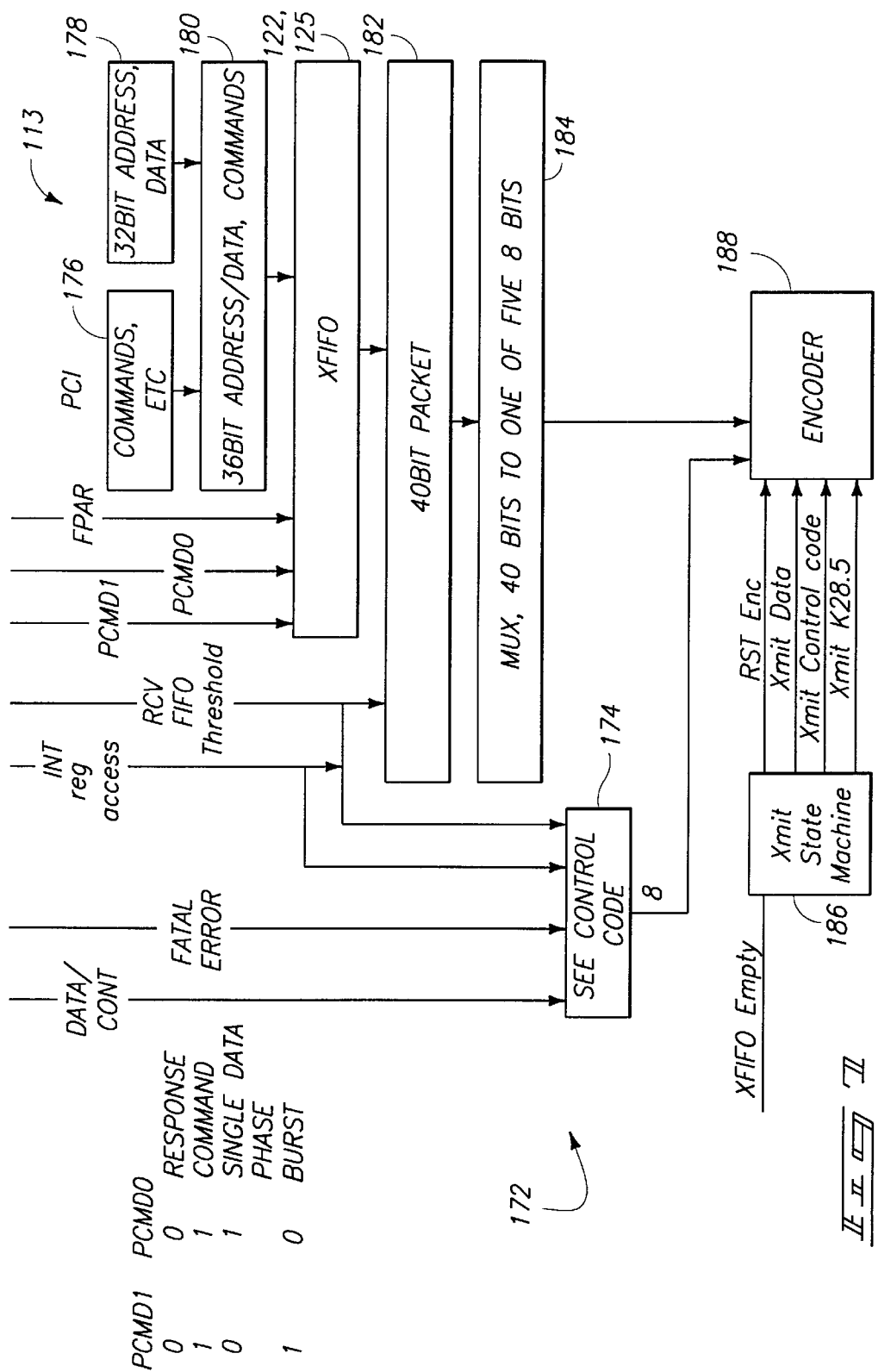

PCI BRIDGE HAVING LATENCY INDUCING SERIAL BUS

TECHNICAL FIELD

This invention relates to interfaces between bus systems of computer devices, and more particularly, to PCI bridge configurations having memory portions provided at physically separate locations coupled together via a bus.

BACKGROUND OF THE INVENTION

The transfer of information within a computer system is handled by one or more buses. A typical computer system includes a number of devices, or agents, such as microprocessors, display devices, storage devices and input/output devices. One or more system buses are used to interconnect these agents in order to transfer control, address and data signals. More recently, computer systems have employed multiple buses, with individual agents being couple to one of the buses.

Multiple-bus computer systems utilize bus bridges in order to connect together the buses such that agents on one bus can couple to agents on another bus. Accordingly, bus bridges provide an interface between two bus systems which enable the connection between subsystems of a computer system. One example involves coupling together a processor and an expansion bus of a computer system via a bus bridge.

One type of bus that has recently become popular is the peripheral component interconnect (PCI) local bus. The PCI bus was designed to place agents, or peripheral components, in closer electrical proximity with a central processing unit so as to improve system performance for graphics, network and multimedia applications.

FIG. 1 illustrates a prior art computer system 30 having a conventional PCI bus bridge 10 coupled between a primary PCI bus 12 and a secondary PCI bus 14. According to one implementation, primary PCI bus 12 is a processor bus and secondary PCI bus is an I/O bus. However, it is understood that bus bridge 10 can be used to couple together any two buses 12 and 14, not merely a processor bus and an I/O bus.

PCI bus bridge 10 includes a primary PCI interface 16, a secondary PCI interface 18, configuration registers 20 and first-in-first-out (FIFO) queues 22 and 24. An agent 26 is coupled to primary PCI bus 12 and another agent 28 is coupled to secondary PCI bus 14. In use, configuration registers 20 operate as a temporary storage buffer for storing data that is being transferred between FIFO queues 22 and 24. FIFO queue 22 is used to store requests that are issued on primary PCI bus 12 and target an agent 26 on bus 12. Similarly, FIFO queue 24 is used to store requests that are issued on secondary PCI bus 14 and target an agent 28 on bus 14. As shown in FIG. 1, the status of FIFO queues 22 and 24 are available to both primary PCI interface 16 and secondary PCI interface 18 at all times.

In operation, the configuration registers 20 are written and read by primary PCI bus 12. Registers 20 control the behavior of primary PCI interface 16, secondary PCI interface 18 and FIFO queues 22 and 24. However, the primary PCI bus 12 and secondary PCI bus 14 cannot be physically-separated apart since the configuration registers 20 are loaded via primary PCI bus 12, and serve to control the action of both primary PCI bus 12 and secondary PCI bus 14. Such inability to separate PCI bus bridge 10 between two buses 12 and 14 reduces the number of available applications. For example, such PCI bus bridge 10 cannot be used to couple a notebook computer having a PCI bus with a docking station having a second PCI bus.

As another example, such PCI bus bridge 10 cannot be used to place a primary PCI bus (and main processor) within the upper screen display housing of a laptop computer, while placing the secondary PCI bus (and associated components) in the lower housing of a laptop computer. Such implementation would be desirable in order to separate the heat-generating main processor from secondary operating components which reduces heat build-up within the lower housing. However, such implementation would require the PCI bus bridge to operate through a flex cable that is fed through a hinge formed between the upper and lower housings. The prior art PCI bus bridge 10 is not capable of realizing such desired configuration.

Therefore, there exists a need to provide for a PCI bus bridge that enables physical separation between a primary PCI bus and a secondary PCI bus. Furthermore, there exists a need to provide for a PCI bus bridge that enables decoupling of physically separate components of a PCI bus bridge. Yet even furthermore, there exists a need to provide a memory configuration that accommodates a latency inducing serial bus.

SUMMARY OF THE INVENTION

An apparatus and a method are provided for configuring a PCI bus bridge between two physically separate locations via two portions, or halves, of a PCI bus bridge. The PCI bus bridge includes a serial bus that is used to connect together the two portions of the bus bridge. The bus bridge joins together two PCI busses that are capable of being separated both electrically and physically. A pair of FIFO queues are provided at each end of the serial bus to allow transfers in each direction. According to one construction, the PCI bus bridge has a connector that allows the two portions of the bridge to be removably coupled together. The serial bus of the bus bridge provides a latency inducing bus that is used to connect together the two halves of the PCI bus bridge, which introduces latency when transmitting information from one memory portion of the bus to another memory portion of the bus. Two sets of redundant configuration registers are also provided, one set in the primary side of the bridge and another set in the secondary side of the bridge. The serial bus of the bus bridge provides a serial communication link that continuously transmits required FIFO status bits across the serial communication link. According to one specific implementation, two separate locations are provided on a laptop and a docking station. According to another specific implementation, two separate locations are provided within the upper and lower housings of a laptop computer.

According to one aspect of the invention, a computer system includes a host processor, a first PCI bus, a second PCI bus and a bus bridge. The first PCI bus is coupled with the host processor. The bus bridge interconnects the first and second PCI buses. The bus bridge includes a first portion having a first bridge memory, a second portion having a second bridge memory, and a latency inducing serial bus interconnecting the first portion and the second portion.

According to another aspect of the invention, a bridge is provided that is coupled between a first bus and a second bus. The bridge includes a first bridge portion, a second bridge portion, and a serial bus. The first bridge portion has a first bridge memory. The second bridge portion has a second bridge memory. The serial bus couples together the first bridge portion and the second bridge portion.

According to even another aspect of the invention, a computer system includes a notebook computer, a docking station, and a bus bridge. The notebook computer has a first PCI bus. The docking station has a second PCI bus. The bus bridge is coupled between the first PCI bus and the second PCI bus. The bus bridge includes a first bridge memory, a second bridge memory, and a serial bus. The serial bus is provided between the first bridge memory and the second bridge memory.

According to yet another aspect of the invention, a method is provided for mating a first PCI bus with a second PCI bus. The first PCI bus is provided by a first agent and the second PCI bus is provided by a second agent. The method includes the steps of: providing a bus bridge having a first portion with a first bridge memory and a second portion with a second bridge memory; wherein the first portion and the second portion are connected for communication by a serial bus; transmitting data between the first portion and the second portion; when a receiving portion of one of the first bridge memory and the second bridge memory approaches an overflow limit, transmitting a threshold signal to a transmitting portion of the other of the first bridge memory and the second bridge memory to prevent overflow in the receiving portion.

BRIEF DESCRIPTION OF THE DRAWINGS

Preferred embodiments of the invention are described below with reference to the following accompanying drawings.

FIG. 4 is a table illustrating data bit definition for the data field within an idle packet.

FIG. 5 is a table illustrating data bit definition for the data field within a data packet.

FIG. 7 is a block diagram illustrating the hierarchy for transmitting idle packets and data packets between FIFO queues pursuant to Applicant's invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A method and apparatus are provided for forming a PCI bus bridge connection having memory components with physically separable parts, where the bus bridge connects together two separate PCI buses within a computer system. In one embodiment, a computer system includes a primary PCI bus and a secondary PCI bus. The system also includes a primary PCI interface and a secondary PCI interface that are removably coupled together via a connector and a flexible cable. It should be understood that this system is for the purpose of illustration and is not provided as a limitation in that the present invention may be practiced on other computer systems where it is desirable to utilize a serial bus connection to couple together a first part and a second part of a PCI bus bridge used to connect together a pair of buses.

A PCI bus bridge provides an interface between a primary PCI bus and a secondary PCI bus. Typically, a PCI bus bridge forms a connection between two subsystems, with PCI agents being connected to each PCI bus, as described above with reference to FIG. 1. Usually, the local bus coupled to the host CPU is referred to as a primary bus, and any bus coupled to PCI agents, units or other PCI bus bridges is referred to as a secondary bus.

For purposes of this disclosure, PCI refers to Peripheral Component Interconnect, a local bus standard initiated by Intel Corporation, and defined by the PCI Local Bus Specification, Revision 2.0 published by the PCI Special Interest Group. A bridge is used to decouple a processor and an expansion bus, and can have a bus width of 32 bits, or 64 bits.

Figure 1:
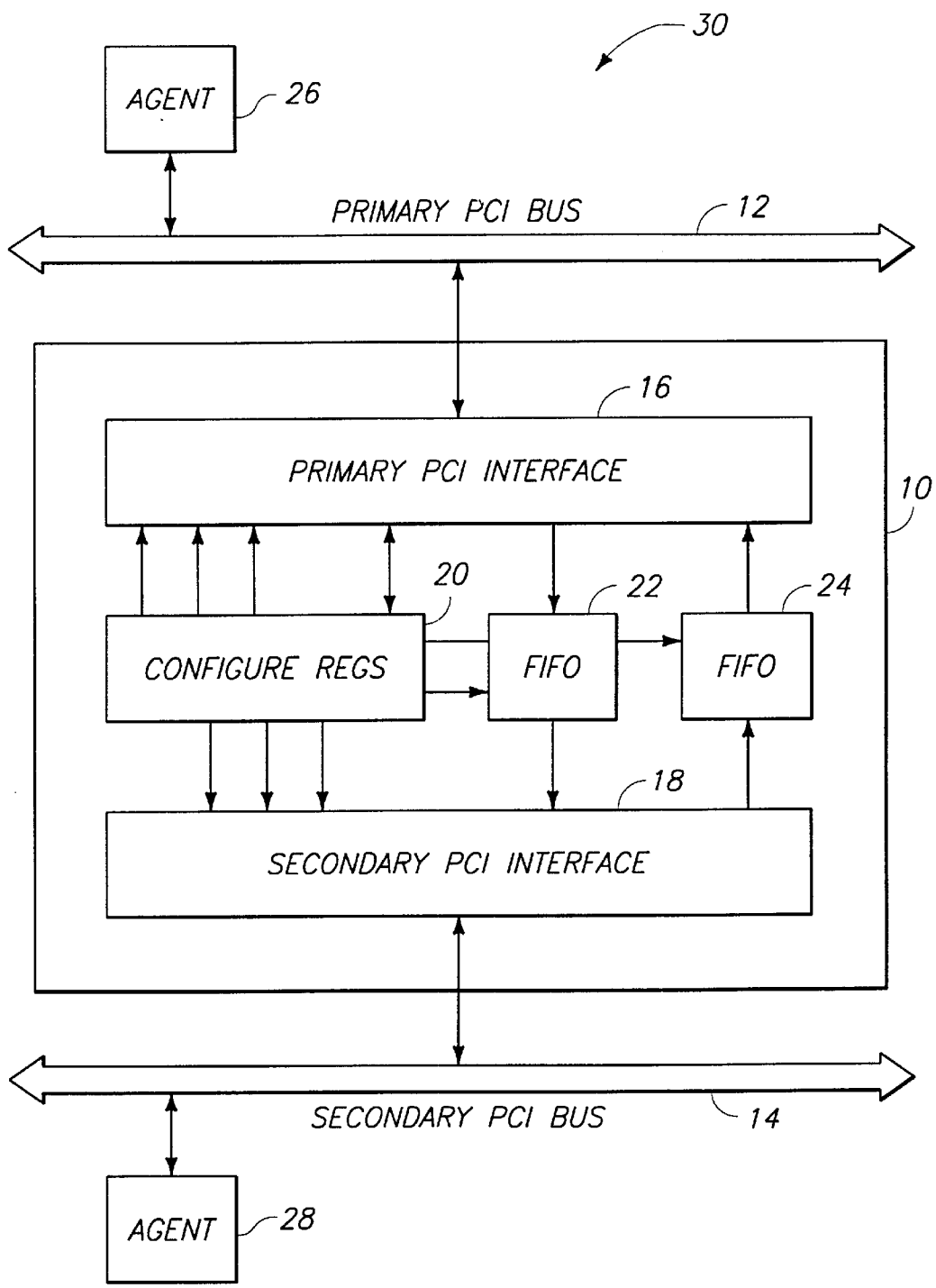
FIG. 1 is a block diagram of a prior art implementation of a conventional PCI bus bridge illustrated in use with a computer system.

Referring now to FIG. 1, a computer system having an architecture that incorporates features of Applicant's invention is identified by reference numeral 130. Computer system 130 includes a PCI bus bridge 110 having a separable serial interconnection, or connector 112 configured to removably couple together a primary PCI bus 12 with a secondary PCI bus 14. According to one construction, connector 112 comprises a pair of male and female serial gigabit ethernet interface connectors, such as a 20 pin serial male/female connector usable to include a 1 gigabit, 2 pair cable, as shown below in the embodiment depicted in FIG. 4. According to one application depicted in FIG. 4, PCI bus bridge 110 is used to removably connect a laptop computer with a docking station. However, it is understood that PCI bus bridge 110 can be used to removably connect together any of a number of buses that require the ability to separate the buses both electrically and physically.

An agent 26 is coupled to primary PCI bus 12 and another agent 28 is coupled to secondary PCI bus 14. Agents 26 and 28 include subsystems of a computer system, and include computers, peripheral components, processors and controllers.

As shown in FIG. 1, PCI bus bridge 110 includes primary configuration registers 120 and secondary configuration registers 121 that are provided on opposite sides of a flex cable 111 having a connector 112, in two distinct physical locations. Hence, primary configuration registers 120 are provided on a primary side, or portion, 126 of bridge 110 and secondary configuration registers 121 are provided on a secondary side, or portion, 127 of bridge 110. Connector 112 separates such primary and secondary sides 126, 127 of bridge 110. In contrast, prior art bus bridges typically use centrally located configuration registers that are shared by both sides of the bus bridge. Accordingly, PCI bus bridge 110 is split into two parts or sides; namely, primary bridge portion 126 and secondary bridge portion 127, with flex cable 111 and flex cable connector 112 providing a signal interconnection having a limited number of wires.

According to one construction, flex cable 111 comprises a flexible Mylar cable, similar to those used when coupling together a screen display, within the upper housing, on a laptop computer with the motherboard contained in the lower housing. According to other constructions, cable 111 comprises any construction for an electrically conductive cable.

Primary configuration registers 120 and secondary configuration registers 121 form redundant configuration registers that are physically separated by cable 111. Additionally, registers 120 and 121 are removably separable via connector 112. Registers 120 are provided on primary bridge portion 126 of bridge 110 and registers 121 are provided on secondary bridge portion 127 of bridge 110. In operation, bridge 110 forms a latency inducing bus that connects together buses 12 and 14.

Figure 2:
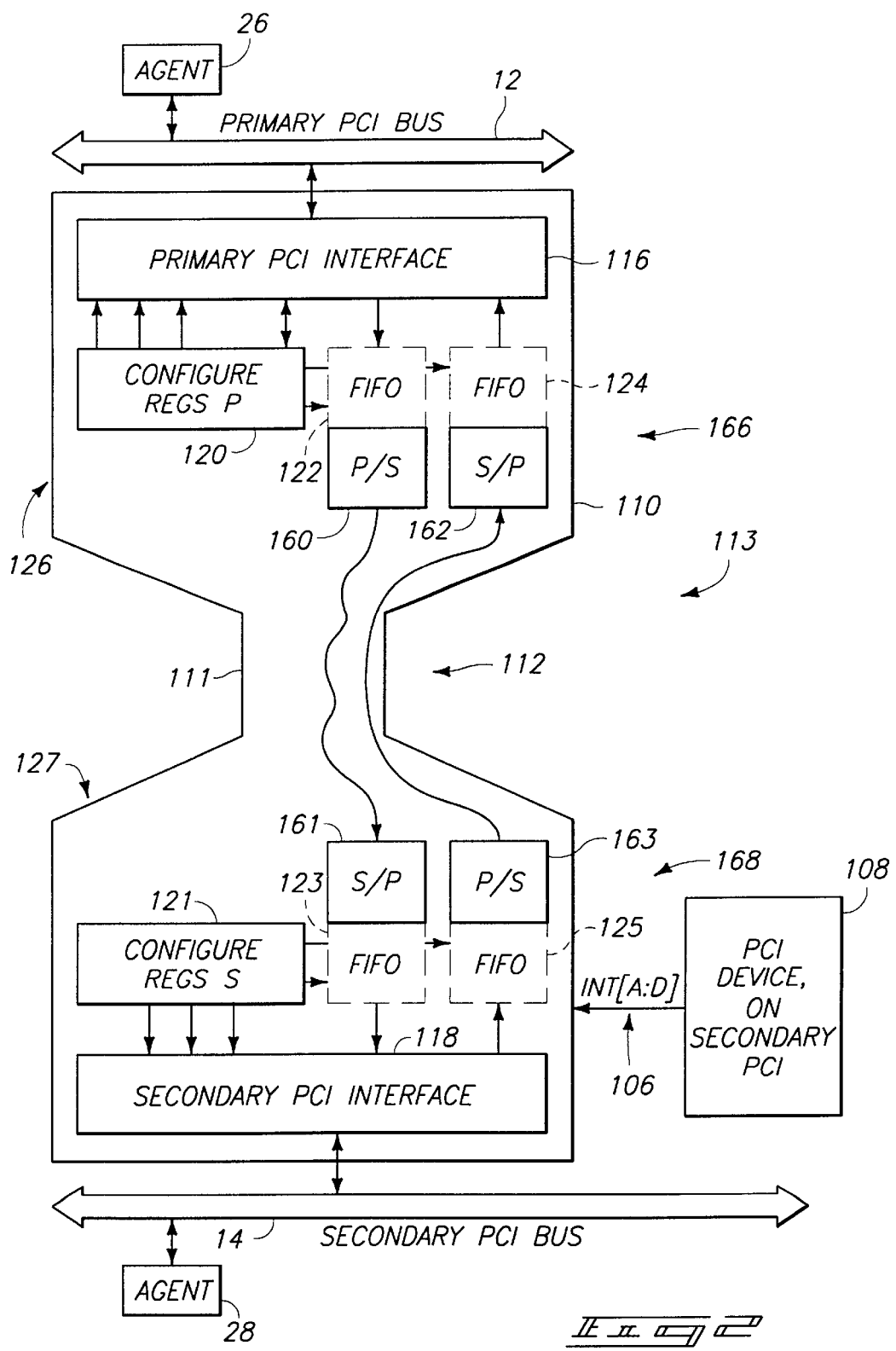
FIG. 2 is a block diagram of a physically separable, two part PCI bus bridge according to one embodiment of the present invention.

As shown in FIG. 2, a pair of FIFO queues 122, 124 and 123, 125 are coupled with primary PCI interface 116 and secondary PCI interface 118, respectively. FIFO queue 122 is connected to FIFO queue 123 via the serial communication link provided by cable 111 and connector 112. More particularly, parallel-to-serial (P/S) interface circuitry 160 and serial-to-parallel (S/P) interface circuitry 161 are used to join FIFO queue 122 and FIFO queue 123. Similarly, FIFO queue 125 is connected with FIFO queue 124 via the serial communication link provided by connector 112. More particularly, parallel-to-serial (P/S) interface circuitry 163 and serial-to-parallel (S/P) interface circuitry 162 are used to join together FIFO queues 125 and 124. Accordingly, FIFO queues are provided at each end of the serial communication link for transfers in each direction. Such configuration is required because a performance mismatch will otherwise be encountered between the PCI buses 12, 14 and other serial buses connected therewith.

P/S interface circuitry 160, 163 and S/P interface circuitry 161, 162 cooperate to form a serial communication bus 113 within bus bridge 110. P/S interface circuitry 160 and 163 converts a parallel interface to a serial interface which is transmitted through bus bridge 110. Similarly, S/P interface circuitry 161, 162 is used to receive the serial interface signal and convert it back to a parallel interface configuration. It is understood that interface circuitry 160–163 also includes respective transmitting and receiving circuitry that is operative to deliver signals across connector 112 of bus bridge 110.

In operation, such construction is required since serial bus 113 will form a dedicated link and PCI buses 12 and 14 provided on opposite sides of bridge 110 may be shared by other devices, and may have access times that are very different from the respective dedicated serial buses 12 and 14. As shown in FIG. 2, FIFO queue 122 uses the serial communication link provided through connector 112, via interface circuitry 160–163, to continuously transmit required FIFO status bits from primary PCI interface 116 to secondary PCI interface 118. FIFO queue 123 receives the transmitted FIFO status bits at secondary PCI interface 118 from primary PCI interface 116. Similarly, FIFO queue 125 transmits FIFO status bits from secondary PCI interface 118 to primary PCI interface 116, and FIFO queue 124 receives the transmitted FIFO status bits from secondary PCI interface 118 to primary PCI interface 116.

In operation, the serial link provided by interface circuitry 160–163, through cable 111 and connector 112 of bridge 110, transmits two types of information packets; namely, idle packets and data packets. The idle packets contain a single byte of information. The data packets transmit 40 bits of information. The data packets contain either PCI data and byte enables, or PCI addresses and commands. The idle packet contains eight bits of status or control information. As a result of the special requirements for FIFO status latency, FIFO flags are transmitted in both the idle packets and the data packets. Accordingly, PCI bus bridge 110 is removably connected via connector 112 by use of FIFO queues 122–125, in combination with configuration registers 120 and 121 which are removably separable via connector 112.

Further details of the construction and operation of configuration registers 120 and 121 and FIFO queues 122–125 are described in greater detail in Applicant's co-pending patent application, "PCI Bridge Configuration Having Physically Separate Parts", U.S. patent application Ser. No. 09/311,911, naming inventors Ronald E. Lange and David Ross Evoy, having attorney docket No. VL5-050, and filed concurrently herewith. Such U.S. patent application Ser. No. 09/311,911, is herein incorporated by reference.

Figure 3:
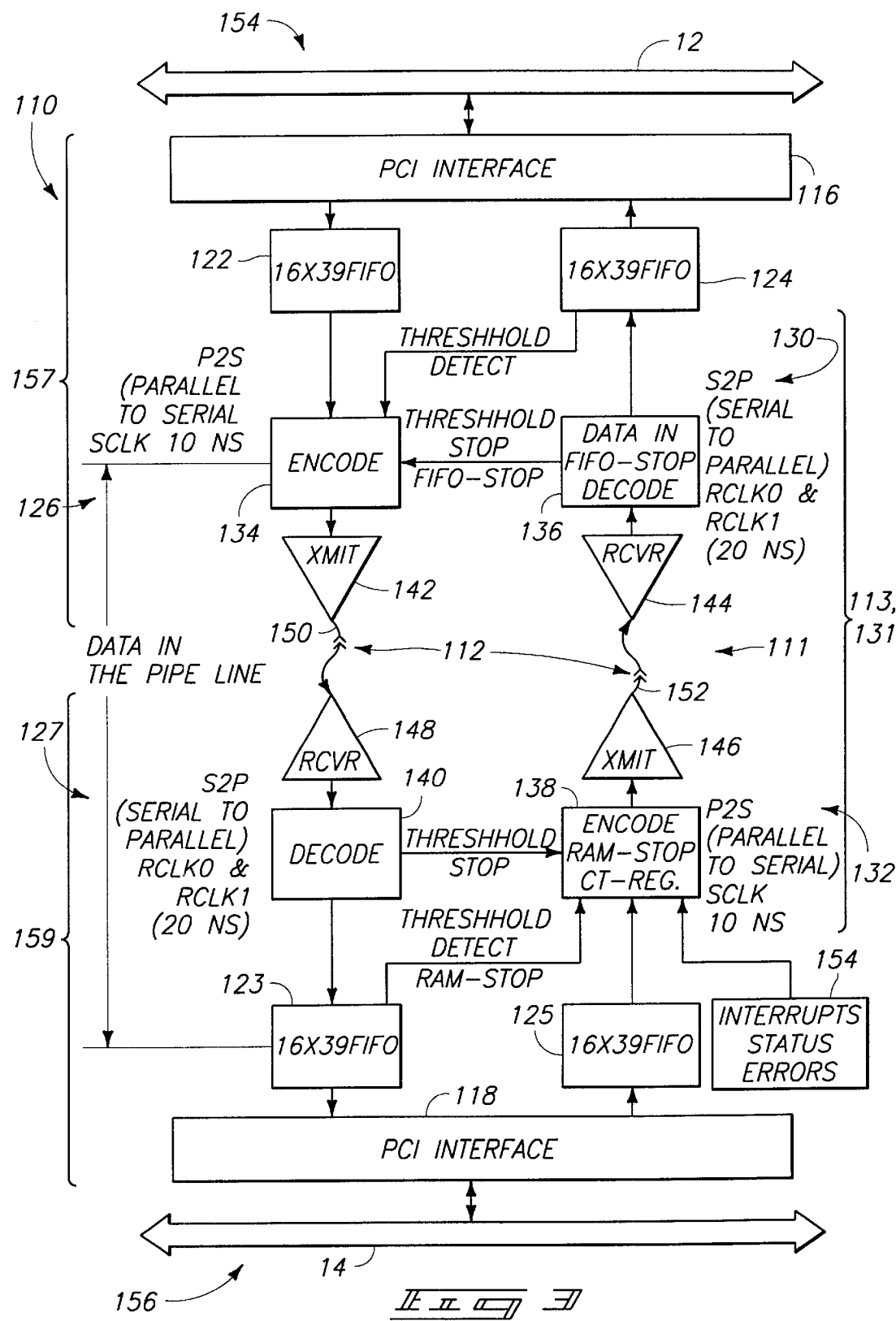
FIG. 3 is a functional block diagram of the memory features of the two part PCI bus bridge of FIG. 2 illustrating implementation of FIFO queue stop timing pursuant to Applicant's invention.

In operation, FIFO queues 122–125 are configured to prevent a FIFO overrun when the primary part, or side, 126 and secondary part, or side, 127 of bridge 110 are configured in physically separate locations. Pursuant to such implementation, the two parts 126 and 127 of PCI bridge 110 are connected together by a latency inducing serial connection, or bus 113. Such technique relies upon a single bit of information being provided via a serial bus by way of cable 111 and connector 112 which provides a threshold level to control serial transmission between primary part 126 and secondary part 127. One exemplary PCI bus configuration and implementation for bus bridge 110 (of FIG. 2) is illustrated below with reference to FIG. 3. FIG. 3 shows a functional block diagram that illustrates the memory features of the two part PCI bus bridge of FIG. 2 that implement FIFO 1, queue stop timing pursuant to Applicant's invention. According to one implementation, PCI bus bridge 110 is used to removably couple together a notebook computer and a docking station.

As shown in FIG. 3, a notebook computer 154 includes primary PCI bus 12 and bus interface circuitry 157. Bus interface circuitry 157 includes primary side 126 of bus bridge 110, which includes primary PCI interface 116, FIFO queues 122 and 124, and serial interconnection bus circuitry 130. Similarly, workstation 156 includes secondary PCI bus 14 and bus interface circuitry 159. Bus interface circuitry 159 includes secondary portion of bus bridge 110; namely, secondary PCI interface 118, FIFO queues 123 and 125, and serial interconnection bus circuitry 132.

Serial interconnection bus circuitry 130 comprises FIFO queues 122 and 124, parallel-to-serial (P/S) encode circuitry 134, serial-to-parallel (S/P) decode circuitry 136, transmitting circuitry 142 and receiving circuitry 144. Additionally, serial interconnection bus circuitry 132 comprises FIFO queues 123 and 125, parallel-to-serial (P/S) encode circuitry 138, serial-to-parallel (S/P) decode circuitry 140, transmitting circuitry 146 and receiving circuitry 148.

It is understood that transmitting circuitry 142, 146 and receiving circuitry 144, 148 are operative together to transmit and receive between primary portion 126 and secondary portion 127 of bus bridge 110. It 11 is also understood that serial interconnection bus circuitry 130 and 132 are signal coupled together via a serial communication link 131, including connector 112. Serial communication link 131 is removably connected via connector 112, between bus circuitry 130 and 132. In one form, serial communication link 131 forms a part of a serial bus 113 (see FIG. 2), defined by bus circuitry 130, 132 and communication link 131.

As shown in FIG. 2, FIFO queues 122, 124 and 123, 125 form a first memory portion 166 and a second memory portion 168, respectively. Accordingly, first memory portion 166 and second memory portion 168 are provided at opposite ends of serial communication bus 113. Information is transferred between first memory portion 166 and second memory portion 168 in each direction along flexible (or flex) cable 111. Such information transfer is required because there exists a performance mismatch between a PCI bus, such as buses 12 and 14, and serial buses, such as bus 113. Even more important, serial bus 113 forms a dedicated link, with PCI buses 12 and 14 on each side of bridge 110 possibly being shared by other devices and possibly having access times that are very different from the access times for the dedicated serial bus 113.

For purposes of describing the use of first memory portion 166 and second memory portion 168 of FIG. 3, agent 26 will be referred to as an initiator and agent 28 will be referred to as a receiver. When initiator 26 is transferring data, FIFO queue 122 is connected to FIFO queue 123 by a wire 150 within the serial link 131 provided in flex cable 111. When FIFO queue 123 is full, it becomes necessary to stop transmission from the output of FIFO queue 122. In order to achieve this, it is required that the logic in the primary side 126 of bus bridge 110 be able to view the FIFO status internal to FIFO 123 in the secondary side 127 of bus: bridge 110. Likewise, it is necessary that, when FIFO queue 125 is transmitting over serial bus 113 to FIFO queue 124, the secondary side 127 of bus bridge 110 has visibility of the status of FIFO queue 124 in order to prevent overrunning of FIFO queue 124 when FIFO queue 124 is full.

Applicant's invention uses serial link 131 to continuously transmit the required FIFO status bits between primary side 126 of bus bridge 110 and secondary side 127 of bus bridge 110. The receiving FIFO queue transmits a full indication when that FIFO queue if close to being full. Locations in the receiving FIFO queue are reserved in order to accommodate the latency that occurs when transmitting the FIFO status. For example, when FIFO queue 122 transmits FIFO status bits to FIFO queue 123, locations in FIFO queue 123 are reserved in order to accommodate the latency that occurs when transmitting the FIFO status.

In operation, serial link 131 transmits two types of information packets: idle packets and data packets. Idle packets contain a single byte of information. Data packets contain 40 bits of information. The contents of idle packets and data packets are normally distinct and separate. The data packet contains either PCI data and byte enables, or PCI address information and commands. Four extra bits of control information are included in the 40 bit data packet. The idle packet contains 8 bits of status or control information. Because of the special requirements for FIFO status latency, the FIFO flags are transmitted in both the idle packets and data packets.

Several observations about latency deserve further discussion in order to understand the implementation of Applicant's invention. More particularly, each receive FIFO queue 123, 124 must transmit a threshold signal to the transmitting side of serial bus bridge 110 when such FIFO queue 123, 124 has reached a limit to the point where overflow will occur if the transmission of data is not stopped. The threshold limit, or the number of available memory locations, to continue receiving is set by the amount of latency that it takes to get a threshold signal from the receive FIFO queue 123, 124 back across the serial bus bridge 110 and to stop the transmission of new packets, plus account for the number of packets still in the transmission path.

There exists a worst case requirement that is used for allocating memory to accommodate FIFO flag latency. Assume that both sides 126 and 127 are transferring data at a maximum speed, and that source data is constantly available. Also assume that the destination side is not unloading any data, which is quite possible if the source is constantly suppling data as assumed above. An analysis is performed by starting with the receiving side.

For example, where transmission occurs over wire 150 of bus 113 the receiving side includes FIFO queue 123, and an analysis is done when FIFO queue 123 just passes the receive threshold. Two clock domains affect this transfer. The receive section and the transmit section run on separate 100 MHZ unsynchronized clocks. Several resulting allocations for worst case FIFO flag latency are as follows: 80 nanoseconds is the maximum time to start new transmission of threshold signal from FIFO queue 123 to FIFO queue 125; 40 nanoseconds is the delay through transmitter, cable and receiver from FIFO queue 124 to FIFO queue 124; 30 nanoseconds is the delay through decode, registering, and re-synchronizing from FIFO queue 124 to FIFO queue 122; 20 nanoseconds is the data encode time for FIFO queue 122; 40 nanoseconds is the delay through transmitter, cable, and receiver from FIFO queue 122 to FIFO queue 123; and 10 nanoseconds is the decode time for FIFO queue 123.

During the time it takes to get the threshold signal back across bridge 110, 150 nanoseconds will elapse (80 nanoseconds plus 40 nanoseconds plus 30 nanoseconds) which will load three more data words into the receive FIFO queue 123. The pipeline from FIFO queue 122 to FIFO queue 123 is about 70 nanoseconds (20 nanoseconds plus 40 nanoseconds plus 10 nanoseconds). Therefore, this pipeline will contain almost two data words in transit. Receive FIFO queue 123 will need to hold 6 words before the pipeline can be stopped.

Threshold detection and link stopping are implemented pursuant to the FIG. 3 construction. The threshold limit on FIFO queues 122–125 is set at 7 levels. More particularly, when the FIFO write pointer has advanced to the point of being 7 levels ahead of the read pointer, the threshold is detected. This actually leaves 10 empty locations. The write pointer is pointing to an empty level, the next to be loaded while the read pointer is pointing to a full level, which is the one to be read.

Accordingly, a method is provided to prevent a FIFO overrun when the primary and secondary parts of the bus bridge are in physically separate locations. Pursuant to this technique, two halves of a PCI bridge are connected by a latency inducing serial bus. A single bit within the interconnecting serial bus provides a threshold level to control serial transmission between the two halves of the PCI bridge. The implementation of threshold detection and link stopping enables such serial transmission.

As shown in FIG. 3, when implementing threshold detection and link stopping, the signal (ram_stop) will occur on a "rclk" in decode block 136. Block 136 crosses to block 134, and is "re_sync" to "sclk". Here, maximum delay is 1 "sclk".

The next "sclk", the "resync" ram_stop signal is put into the "ct_reg". Encoding can start immediately, or up to five clocks later. Encoding takes two "sclks". Here, a maximum delay is 8 "sclks". As shown in FIG. 3, 10B code is at transmit blocks 142 or 146 "serdes", or serializer/deserializer, on next "sclk". Here, there is a 1 "sclk" delay. Transmitter latency is 9.2 nanoseconds. Cable latency, at 1.5 nanoseconds per foot multiplied by 15 feet of cable, is 22.5 nanoseconds, or 28 bit times. Here, a cable delay of 30 nanoseconds is utilized to cover the 28 bit times delay. A receiver latency is 39 nanoseconds. Here, a maximum delay of 78 nanoseconds, or 8 "sclks", is utilized.

The latency, or delay, times described above should put data into the S2P data-in register next clk. Decode is 1 "rclk" to the "data-out"register. The next "rclk" would put the data into the "sp_reg" (receive).

Here, a maximum delay is 4 "sclks". At block 136, the signal is now referred to as "FIFO_stop", and goes to the transmitting P2S block 134 which is to be stopped. One more "sclk" is then added to resynchronize (re_sync) the signal. Transmission will stop at the end of the block being transmitted. A new block could have started on the same clock as "FIFO-stop" went to "re_sync". Here, a maximum delay of 6 "sclks" is added to the end of transmission.

Accordingly, a total of 28 "sclks" is taken to stop the transmission of data as implemented in FIG. 3. Going backwards on the data path from the receiver, we would count the data-out register (1 rclk), the data-in (1 rclk) register, the Serdes receiver and cable and transmitter (8 sclks). Here, a maximum delay of 10 "sclks" occurs in the pipeline.

In order to perform this in a backwards manner, this would take 38 "sclks" in order to stop the data and empty the pipeline. Since the transmission of a block takes five "sclks", the correct answer should be either 35 (seven blocks) or 40 (eight blocks). Since we started with 10 empty blocks when the threshold was detected, we should have two spare locations.

FIG. 4 is a table illustrating the data bit definition for individual data bits D0 through D7 for the data field within an idle packet. The control code and corresponding power on reset (POR) idle value are shown for individual data bits D0 through D7. Power on reset refers to power on condition when you apply reset. The bit, control code name and function are given below for bits D0, D6 and D7.

Data bit 7, identified with identifier name RCVF, indicates the current state of the threshold in the receiving FIFO for the associated device. The transmitting device should delay transfers when bit 7 is set. Bit 7 is set with every data and every idle packet. The RCVF bit in the destination side (primary or secondary) of the bus bridge retains its previous value.

Bit 6, identified as INT, reflects the current state of the interrupt line. A "1" indicates that an interrupt is pending. A "0" indicates that no interrupt is currently pending. Bit 6 is sent with every idle packet. Bit 6 is only valid for secondary to primary side communication.

FIG. 5 is a table illustrating the data bit definition for individual data bits D0 through D32 for the data field within a data packet. The 1 bit, control code name and function are give below for bits D0 through D39.

Bit 39, identified as RCVF, indicates the current state of the threshold in the receiving FIFO of the devices. The transmitting device should delay transfers when bit 39 is set. Bit 39 is sent with every data and every idle packet. With respect to bit 39, the RCVF bit in the destination side (primary or secondary) of the bus bridge retains its previous value.

Bit 38, identified as FPAR, indicates a parity error was detected, and reflects the current state of the interrupt line. A "1" indicates that an interrupt is pending. A "0" indicates that no interrupt is currently pending. Bit 38 is sent with every data and every idle packet. Bit 38 is ignored if the idle packet is in error, and the signal FPAR retains its previous value in the primary side. Bit 38 is only valid for secondary to primary side communication.

Bits 37 and 36, identified as PCMD[1:0] cooperate to identify four functions. First, for bit values [0:0], a response function is provided, where D35:32 is PCI byte enables, and D31:0 is data. Secondly, for bits [0:1], a command function is provided where D35:32 is PCI byte enables, and D31:0 is data. For the third case where bit values [1:11], a single data phase function is provided, where D35:32 is PCI command, and D31:0 is address. Finally, for bit values [1:0], a burst function is provided, where D35:32 is PCI byte enables, and D31:0 is data.

For bits 35–32, identified as CMD/BE[3:0], when PCMD [1:0] equals 0:1, these bits indicate a PCI command. When PCMD[1:0] equals 1:1, 1:0, or 0:0, these bits provide the PCI byte enables.

For the case of bits 31-0, identified as PCI Data/Adr, a Data/Address function is provided as defined by the PCMD bits.

Figure 6:
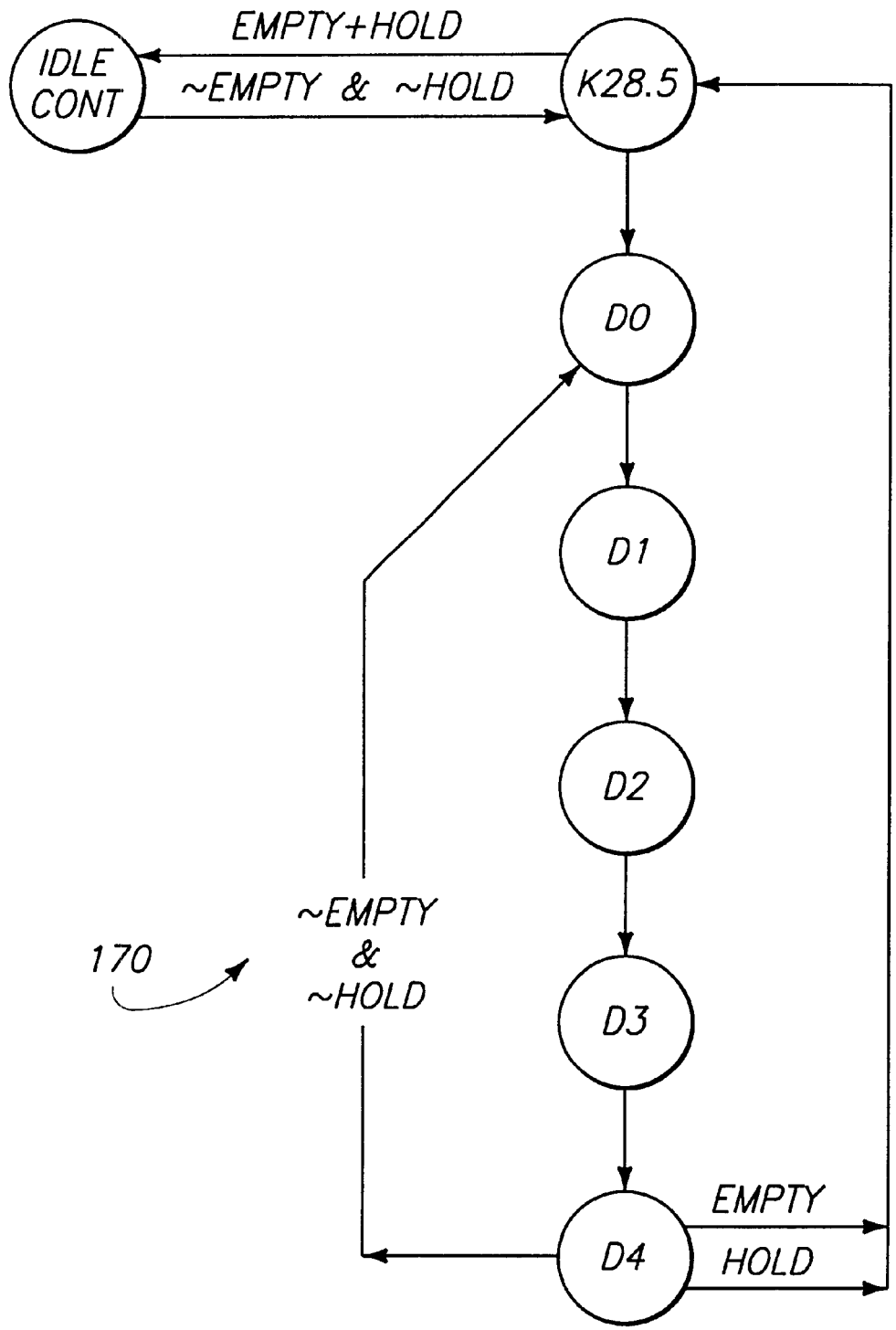
FIG. 6 is an overview diagram illustrating the transmit data state for a portion of the data field within an idle packet.

FIG. 6 illustrates a transmit-data state diagram 170 for a portion of the data field within an idle packet. More particularly, a data state diagram 166 depicts the state for data bits D0 through D7 for the corresponding data field within an idle packet. "Empty" indicates that the transmit (XMIT) FIFO queue is empty. "Hold" indicates that the other sides receive signaled RCVF.

FIG. 7 is a block diagram illustrating the hierarchy for transmitting idle packets and data packets between FIFO queues pursuant to Applicant's invention. More particularly, interface 172 is used to communicate the status of FIFO queues in near real time. For example, the status of FIFO queues 122 and 125 are transmitted via such interface 172. Interface 172 is required to transfer various types of information packets, including idle packets and data packets. Applicant's invention places the FIFO status bits in both data packets and idle packets. This implementation allows data transmissions to be back-to-back with no need for interleaving idle packets. Additionally, this implementation allows a PCI bus to communicate over a serial bus where there are FIFO queues on each side of the end points of the serial bus. A high performance bus is also provided that can tolerate variable latency delays on each side of the PCI bus.

Interface 172 includes specific instances of control code 174 delivered in an 8-bit configuration to encoding circuitry 188. Encoding circuitry 188 includes encoders 134 and 138 (see FIG. 3). According to one construction, encoding circuitry 188 comprises an 8-to-10 encoder.

Encoding circuitry 188 also receives a plurality of input signals from a transmit (Xmit) state machine 186. Transmit state machine 186 receives an input signal from XFIFO Empty, and delivers output signals: RST Enc; Xmit Data; Xmit Control code; and Xmit K28.5.

Control code 174 comprises a data/control input identified as DATA/CONT, a FATAL ERROR signal, an INTERRUPT REGISTER ACCESS (INT reg access), and a RECEIVE FIFO THRESHOLD signal (RCV FIFO Threshold).

Bit values identified for PCMD1 and PCMD0 cooperate to identify four functions shown in FIG. 7. Such input signals PCMD1 and PCMD0 comprise bits which are input to XFIFO 122, 125. Additionally, a parity value (FPAR) is input into XFIFO 122, 125. XFIFO 122, 125 each comprise a 39-bit quantity. A respective PCI interface transfers information in the forms of commands 176 and 32-bit address/data 178 such that a 36-bit address/data and commands transmission 180 is provided to each XFIFO 122 and 125. A 40-bit packet 182 is formed by an input from XFIFO 122 and 125, in combination with RCV FIFO Threshold signal. Packet 182 is processed by a multiplexer (MUX) 184 wherein 40 bits are converted to one of five 8-bit bytes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer system comprising:
   a host processor;
   a first PCI bus coupled with the host processor;
   a second PCI bus;
   a bus bridge interconnecting the first and second PCI buses, the bus bridge including:
      a first portion having a first bridge memory:
      a second portion having a second bridge memory; and
      a latency inducing serial bus adapted to continuously provide FIFO status bits from the first portion to the second portion.

2. The computer system of claim 1 wherein the first bridge memory and the second bridge memory each comprise a transmitting FIFO queue and a receiving FIFO queue.

3. The computer system of claim 1 wherein the first portion includes a first FIFO queue and the second portion includes a second FIFO queue.

4. The computer system of claim 1 further comprising a connector interposed between the first portion and the second portion, and operative to removably couple the first portion with the second portion.

5. The computer system of claim 1 wherein the first portion comprises a primary side of the bridge, the primary side of the bridge including a first configuration register having read/write registers.

6. The computer system of claim 1 wherein the first portion comprises a primary side of the bridge, the second portion comprises a secondary side of the bridge, and the secondary side comprises a second configuration register including read/write registers.

7. The computer system of claim 1 wherein the first bridge memory includes a transmitting FIFO queue and a receiving FIFO queue, and the second bridge memory includes a transmitting FIFO queue and a receiving FIFO queue.

8. The computer system of claim 1 wherein the serial bus comprises a serial communication link configured to transmit idle packets and data packets between the first bridge memory and the second bridge memory.

9. A bridge coupled between a first bus and a second bus, comprising:
   a first bridge portion having a first bridge memory and a first configuration register;
   a second bridge portion having a second bridge memory and a second configuration register; and
   a serial bus continuously coupling together the first bridge portion and the second bridge portion so as to provide FIFO status bits from the first bridge portion to the second bridge portion.

10. The bridge of claim 9 wherein the first bridge memory comprises a first FIFO queue and the second bridge memory comprises a second FIFO queue.

11. The bridge of claim 10 wherein the first FIFO queue and the second FIFO queue each comprise a transmitting FIFO queue and a receiving FIFO queue.

12. The bridge of claim 9 wherein the serial bus comprises a latency inducing serial communication link.

13. The bridge of claim 12 wherein the serial communication link is configured to transmit idle packets and data packets between the first bridge memory and the second bridge memory.

14. A method of mating a first PCI bus with a second PCI bus, the first PCI bus provided by a first agent and the second PCI bus provided by a second agent, the method comprising the steps of:
   providing a bus bridge having a first portion with a first bridge memory and a second portion with a second bridge memory, wherein the first portion and the second portion are continuously connected for communication of data and FIFO status bits by a serial bus;
   transmitting data between the first portion and the second portion; and
   when a receiving portion of one of the first bridge memory and the second bridge memory approaches an overflow limit, transmitting a threshold signal to a transmitting portion of the other of the first bridge memory and the second bridge memory to prevent overflow of the receiving portion.

15. The method of claim 14 wherein the step of transmitting a threshold signal comprises transferring FIFO status bits from one of the first bridge memory and the second bridge memory to the other of the first bridge memory and the second bridge memory, and monitoring receipt of the transmitted FIFO status bits to prevent overrunning memory space in the other of the first bridge memory and the second bridge memory.

16. The method of claim 14 wherein a the first portion and the second portion are run on separate unsynchronized clocks, and wherein the step of transmitting a threshold signal comprises allocating a number of available memory locations required to continue receiving information that is set by: a) the amount of latency required to get a threshold signal from a receiving FIFO queue in one of the first and second bridge memories to a transmitting FIFO queue in the other of the first and second bridge memories: and to stop the transmission of new information packets; and b) the number of packets still within a transmission path of the serial bus.

17. The method of claim 16 wherein the first bridge memory and the second bridge memory each comprise a transmitting FIFO queue and a receiving FIFO queue.

* * * * *